United States Patent [19]

Liang

[11] Patent Number: 5,481,911

[45] Date of Patent: Jan. 9, 1996

[54] CESSPIT WATER LEVEL INDICATOR

[76] Inventor: Chung-Ho Liang, 1/F., No. 10, Lane 16, Shuang-Ho St., Yungho City, Taipei Hsien, Taiwan

[21] Appl. No.: 152,374

[22] Filed: Nov. 16, 1993

[51] Int. Cl.⁶ .......................... G01F 23/60; H01C 10/10
[52] U.S. Cl. .............................. 73/313; 338/41
[58] Field of Search .................... 73/305, 308, 309, 73/313, 319; 200/84 C; 338/33, 41

[56] References Cited

U.S. PATENT DOCUMENTS

| | | | |
|---|---|---|---|
| 2,647,395 | 8/1953 | Smith et al. | 73/309 |
| 3,849,770 | 11/1974 | Hayashida | 200/84 C X |
| 3,908,461 | 9/1975 | Turpen | 338/41 X |
| 3,976,963 | 8/1976 | Kübler | 73/313 |
| 4,384,184 | 5/1983 | Alvarez | 200/84 C |

Primary Examiner—William A. Cuchlinski, Jr.
Assistant Examiner—Willie Morris Worth
Attorney, Agent, or Firm—Morton J. Rosenberg; David I. Klein

[57] ABSTRACT

A cesspit water level indicator is provided. The water level indicator includes an expansible element which carries a sliding rod to move up and down relative to a fixed rod responsive to the change of water level in a cesspit. The sliding rod includes an electrical contact in the form of a pin. The pin slidably engages a resistive plate mounted to the fixed rod. The change in electrical resistance is indicative of the change of water level in the cesspit.

1 Claim, 6 Drawing Sheets

CESSPIT WATER LEVEL INDICATOR

BACKGROUND OF THE INVENTION

The present invention relates to water level indicators and relates more particularly to a water level indicator for use in automatically indicating the current water level in a cesspit.

Conventionally, drainage or sewage from the cesspits of a ship was generally directly discharged into rivers, lakes or the sea, causing environmental pollution. This has been prohibited in most countries in the world. Now, movable cesspits are commonly used in vessels so that they can be conveniently removed and cleaned when they have been filled. However, a movable cesspit must be regularly opened and checked to determine if it still has empty space for receiving sewage. It is not sanitary to frequently open a movable cesspit to determine the liquid level therein.

SUMMARY OF THE INVENTION

The present invention has been accomplished to eliminate the aforesaid problem. It is therefore an object of the present invention to provide a cesspit water level indicator which can automatically indicate the current water level in a cesspit without opening said cesspit. It is another object of the present invention to provide a cesspit water level indicator which is suitable for use in all kinds of ships. It is still another object of the present invention to provide a cesspit water level indicator which is durable in use and free from the effect of alkaline or acid solutions.

According to the present invention, a cesspit water level indicator comprises an expansible element to carry a sliding rod, moving the sliding rod up and down on a fixed rod responsive to the change of water level in the cesspit. The movement of the sliding rod alternatively induces reed switches to turn on light emitting diodes, providing an indication of the current water level in the cesspit, through the control of a control circuit and under the protection of resistors.

DETAILED DESCRIPTION OF THE PREFERRED EMBODIMENTS

Figure 1:
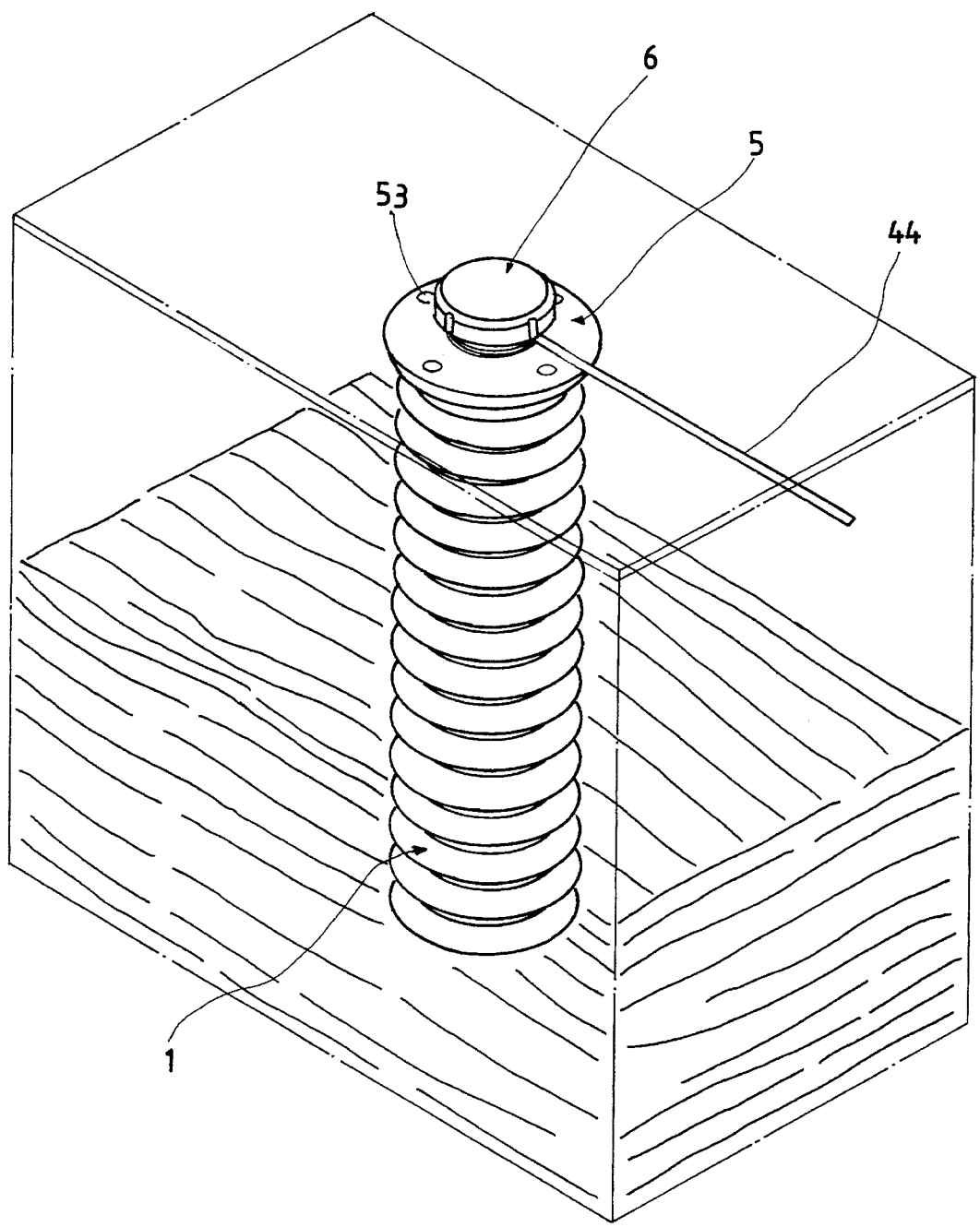
FIG. 1 is a perspective view of the present invention installed in a cesspit.
Figure 2:
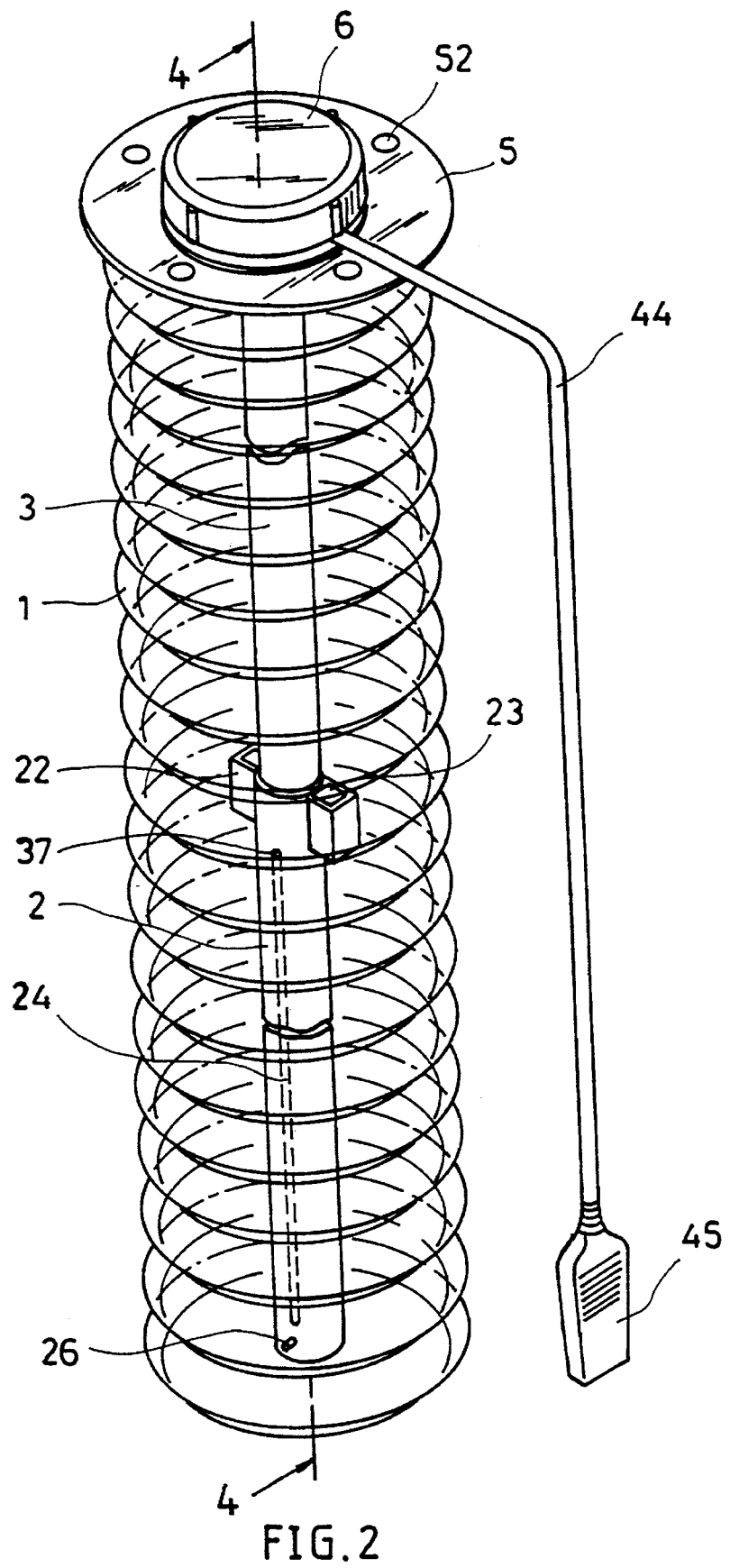
FIG. 2 is a perspective view of the preferred embodiment of the cesspit water level indicator of the present invention.
Figure 3:
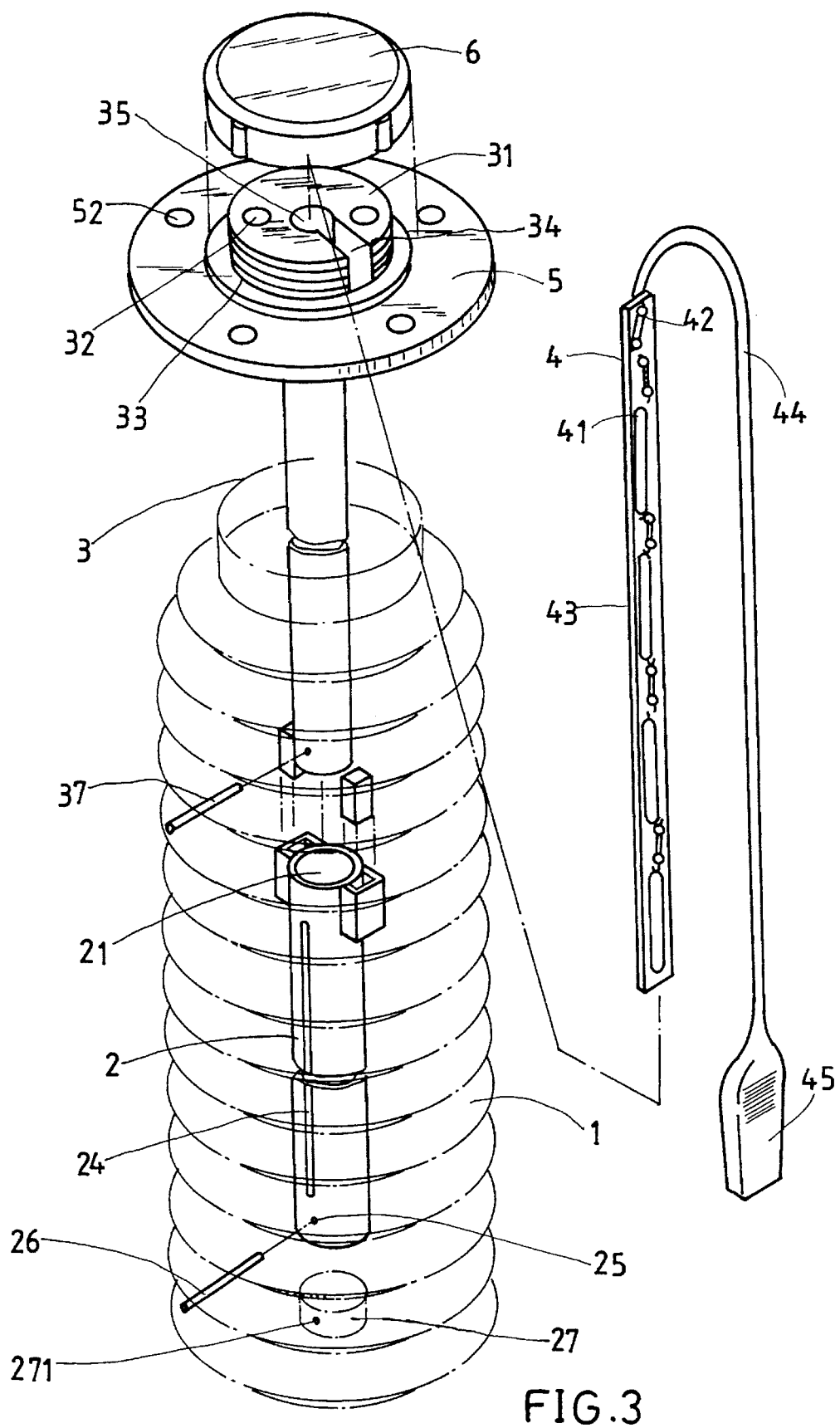
FIG. 3 is an exploded perspective view of the preferred embodiment of the cesspit water level indicator of the present invention.
Figure 4:
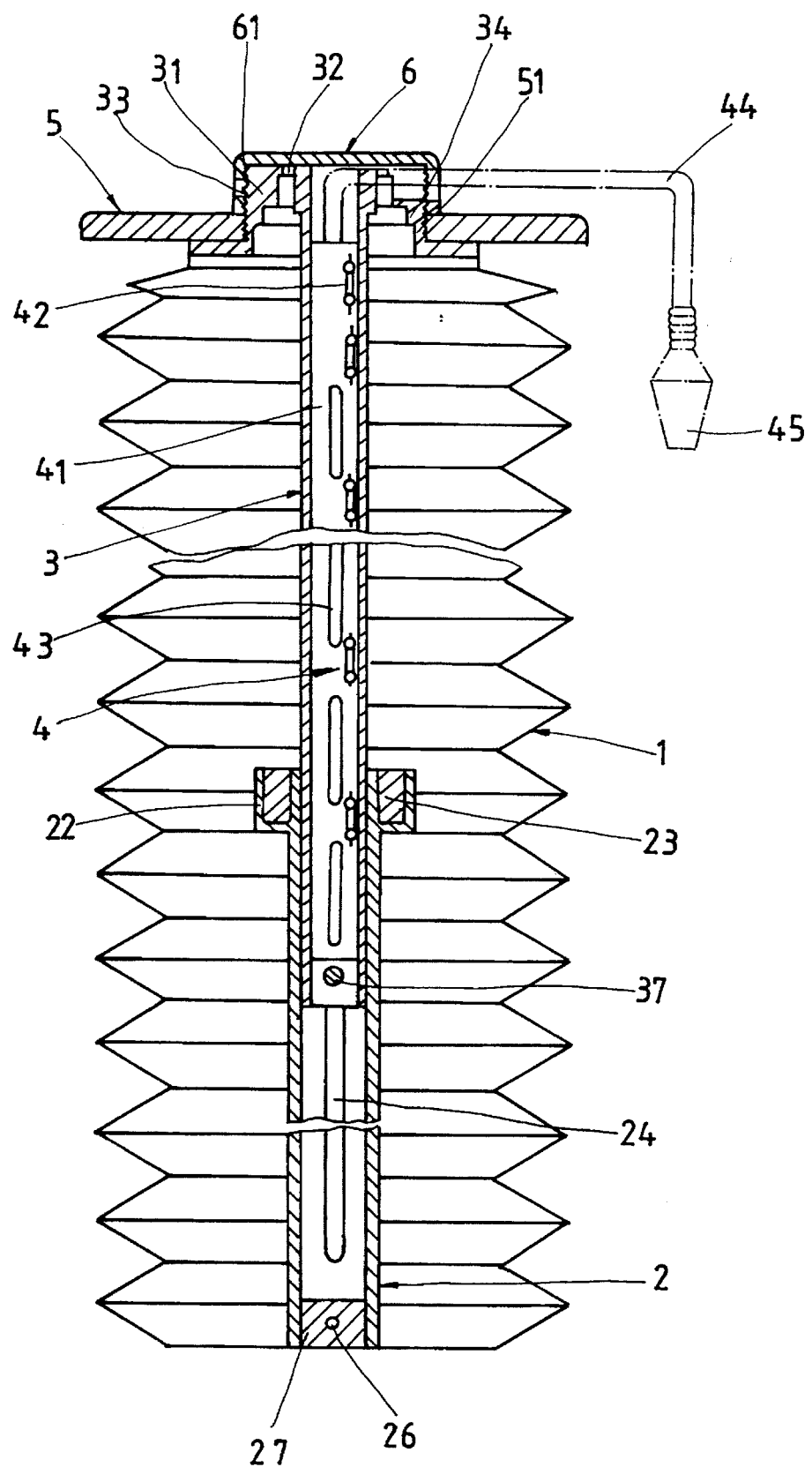
FIG. 4 is a cross-section taken on line 4—4 of FIG. 2.
Figure 5:
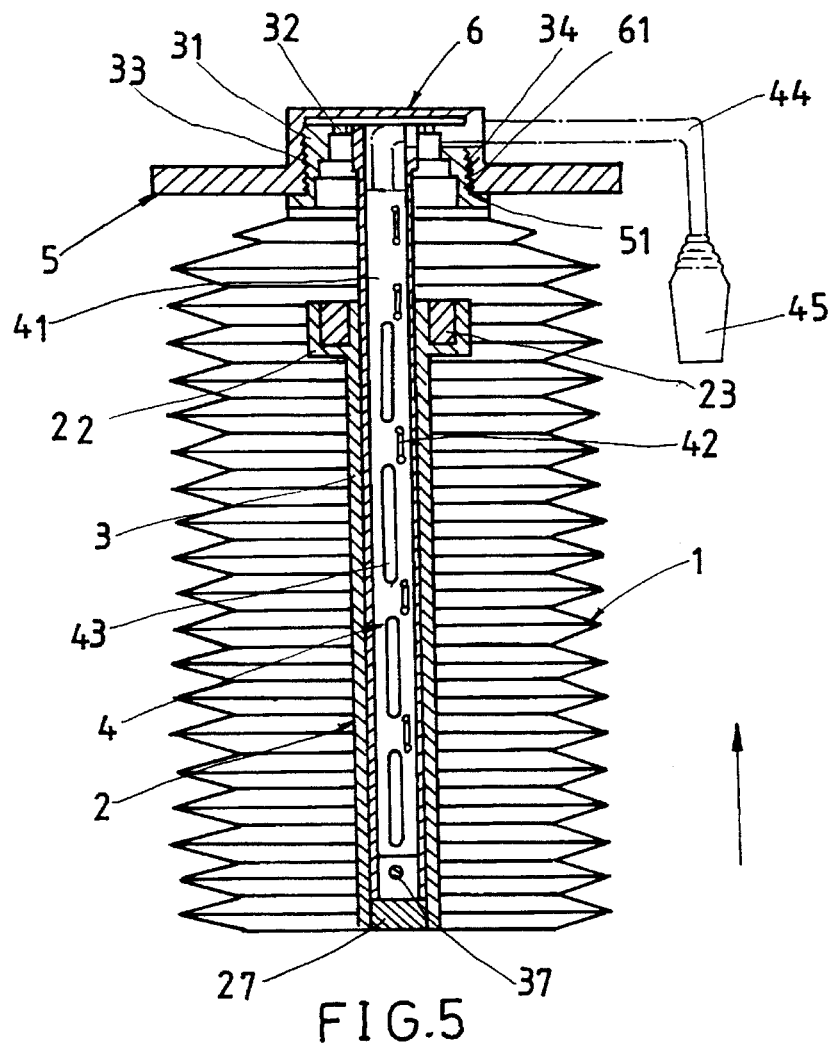
FIG. 5 is a cross-section showing that the expansible element is compressed to lift the sliding rod.
Figure 6:
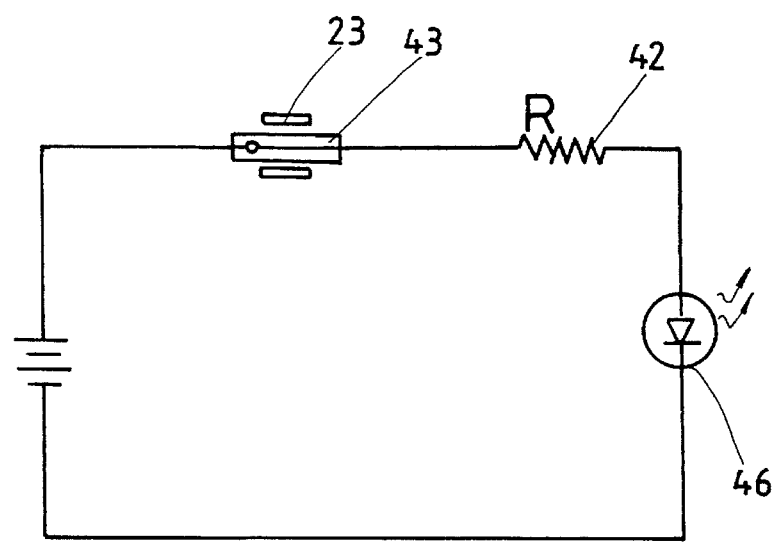
FIG. 6 is a circuit diagram of the control circuit according to the present invention.

Referring to FIGS. 1 through 6, there is shown a cesspit water level indicator comprised of an expansible element 1, a sliding rod 2, a fixed rod 3, a control circuit 4, a mounting plate 5, and a cap 6.

Expansible element 1 is an element made from corrosion-resisting silicon rubber which can be expanded and compressed and is free from the effect of alkaline or acid solution.

Sliding rod 2 is a round, elongated rod having a round hole 21 through the central axis thereof, and two projecting portions 22 bilaterally disposed at one end. Each projecting portion holding a magnet 23 therein. Two slide slots 24 are formed longitudinally on the outer wall surface thereof, at two opposing locations. A hole 25 is formed at an opposing end through which a pin 26 is inserted to secure a flexible insert 27 in position. The flexible insert 27 has a pin hole 271 formed therethrough and disposed in alignment with the hole 25 of the sliding rod 2 for fastening flexible insert 27 to sliding rod 2 with the pin 26.

Fixed rod 3 has an enlarged, circular head 31 at one end, and a round bore 35 extending through the central axis thereof. The circular head 31 of the fixed rod 3 has two vent holes 32 and a notch 34 formed at the top, respectively provided for discharging exhaust air from the expansible element 1 and for mounting the control circuit 4. A male threaded portion 33 is formed around the periphery of the circular head 31. The fixed rod 3 further comprises a hole 36 formed through the opposing end thereof. By inserting a pin 37 through the sliding slots 24 and the hole 36, the sliding rod 2 is movably secured to the fixed rod 3.

Control circuit 4 comprises a printed circuit board 41 having a plurality of resistors 42 and a plurality of reed switches 43 to which a plurality of light emitting diodes 46 are respectively coupled thereto and to an external power supply. The power supply is coupled to the printed circuit board through a cable 44 and a power plug 45. The number of resistors 42, reed switches 43 and light emitting diodes 46 are determined according to the depth of the cesspit into which the water level indicator is to be incorporated. When the expansible element 1 is compressed due to the increase of the water level in the cesspit, the sliding rod 2 is lifted, causing the two magnets 23 to cause a closure of a corresponding reed switch 43, so as to drive a corresponding light emitting diode 46 to light by means of a current coupled through a corresponding resistor 42. Through the indication provided by the particular light emitting diode 46 illuminated, the change of water level in the cesspit is indicated.

Figures 7, 7A:
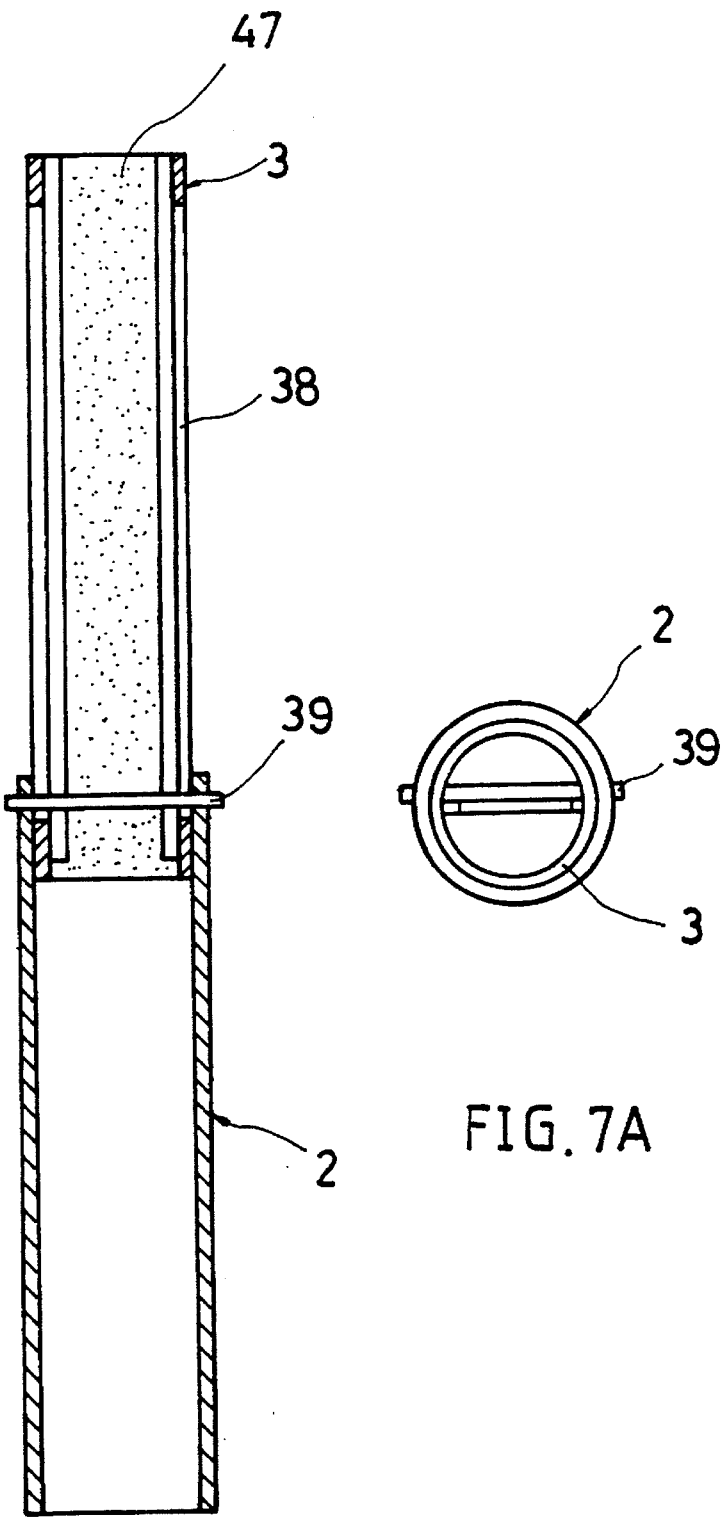
FIG. 7 illustrates an alternate form of the present invention.
FIG. 7A is a top view of the embodiment of FIG. 7.

Referring to FIGS. 7 and 7A, there is illustrated an alternate form of the control circuit 4. In this embodiment, a variable resistor is used to replace the magnetically actuated switch control circuit. A variable resistor in accordance with the present invention may be a coil type or carbon power type resistive element. As illustrated, the variable resistive element is made into an elongated plate 47 set in the fixed rod 3. The fixed rod 3 has two sliding slots 38 eccentrically formed therethrough. A pin 39 is inserted through the slots 38 to secure the sliding rod 2 to the fixed rod 3. When the expansible element 1 is compressed due to an increasing water level in the cesspit, the pin 39 is lifted along the sliding slots 38, but is constantly maintained in contact with the elongated plate 47, forming a sliding electrical contact. Because the elongated plate 47 in combination with the pin 39 form a variable resistor, any position change of the pin 39 can be measured by a watt-hour meter or counter which is responsive to the change of resistance between the elongated plate 47 and the pin 39.

Mounting plate 5 is a ring-shaped plate, having a female thread portion 51 for receiving the male thread portion 33 of the circular head 31 of the fixed rod 3. Mounting plate 5 has a plurality of fastening holes 52 through which screw means 53 are fastened to fixedly secure the mounting plate 5 on a cesspit.

Cap 6 is a circular covering having a female thread portion 61 for coupling to the male thread portion 33 of the circular head 31 of the fixed rod 3. When installed, a gap is maintained for passage of the cable 44 as well as air which is displaced to or from the interior of the expansible element 1, through the openings 32.

After the expansible element 1, the sliding rod 2, the fixed rod 3 and the control circuit 4 are respectively secured to the mounting plate 5, the mounting plate is fixedly mounted on a cesspit by screw means 53 and the cap 6 is then mounted on the circular head 31 of the fixed rod 3. When water level in the cesspit is in a zero reading condition, the expansible element 1 and the sliding rod 2 are in a fully extended condition. When the water level is increasing, buoyancy causes the expansible element 1 and the sliding rod 2 to move upwards. When the sliding rod 2 is lifting, the two magnets 23 on the sliding rod 2 cause the reed switches 43 of the control circuit 4 to be alternatively closed as they move into proximity of the magnets, so as to further drive the light emitting diodes 46 to alternatively indicate the current water level.

The described water level indicator is therefore very helpful for use in the cesspits of a vessel. By means of the operation of such a water level indicator, one can clearly know the present water level in a cesspit without opening its cover.

What is claimed is:

1. A cesspit water level indicator, comprising:

a hollow expansible element formed of a corrosion-resisting flexible material having a closed end and an opposing open end for longitudinal extension within a cesspit;

a fixed rod member disposed within said hollow expansible element and being defined by a longitudinally extended first cylindrical wall and a first through bore extending between opposing longitudinal ends thereof, said fixed rod member having an enlarged circular head formed on a first of said opposing longitudinal ends and coupled to said open end of hollow expansible element to form a closure therefore, said circular head having an externally threaded perimeter surface and a slotted through opening formed longitudinally therethrough and in open communication with said first through bore, said slotted through opening extending radially from a central portion of said circular head through said perimeter surface thereof, said circular head having a pair of vent holes formed longitudinally therethrough for passage of air to and from said hollow expansible element, said fixed rod member having a pair of slotted through openings extending longitudinally on opposing sides of said first cylindrical wall;

a sliding rod member disposed within said hollow expansible element and telescopically coupled to said fixed rod member, said sliding rod member being defined by a longitudinally extended second cylindrical wall and a second through bore extending between opposing longitudinal ends thereof, said sliding rod member having a first of said opposing longitudinal ends coupled to said closed end of said hollow expansible element for longitudinal displacement therewith responsive to a raising water level within the cesspit and a pair of apertures formed through opposing sides of said second cylindrical wall adjacent a second of said opposing longitudinal ends thereof, a second of said opposing ends of said fixed rod member being displaceably disposed within said second through bore adjacent said second end of said sliding rod member and secured thereto by a connecting pin extending through said pair of apertures of said second cylindrical wall and said pair of slotted through opening of said first cylindrical wall;

control circuit means for detecting displacement of said sliding rod member, said control circuit means including (1) a variable resistor disposed in said first through bore, said variable resistor being defined by a longitudinally extended resistive element disposed in sliding contact with said connecting pin, and (2) a cable extending through said slotted opening of said circular head for providing electrical coupling to said variable resistor;

a ring-shaped mounting plate secured to an upper portion of the cesspit and having a central through opening formed therein, said central through opening having a female thread formed therein for threaded coupling with said circular head of said of said fixed rod member; and, a circular cap having a female threaded portion for coupling on said circular head of said fixed rod member, said cap being spaced above said ring-shaded mounting plate to form a gap for passage of said cable and air flowing from and to said vent holes.

* * * * *